(12) United States Patent
Togawa

(10) Patent No.: US 7,140,030 B2
(45) Date of Patent: Nov. 21, 2006

(54) DISC DRIVE APPARATUS WITH LOADING MECHANISM FOR DIFFERENT SIZED DISCS

(75) Inventor: Katsutake Togawa, Takasaki (JP)

(73) Assignee: Victor Company of Japan, Limited, Kanagawa-Ken (JP)

(*) Notice: Subject to any disclaimer, the term of this patent is extended or adjusted under 35 U.S.C. 154(b) by 401 days.

(21) Appl. No.: 10/853,523

(22) Filed: May 26, 2004

(65) Prior Publication Data

US 2004/0250268 A1  Dec. 9, 2004

(30) Foreign Application Priority Data

Jun. 6, 2003  (JP) .............................. 2003-162826

(51) Int. Cl.
*G11B 17/04* (2006.01)

(52) U.S. Cl. ..................... 720/623; 720/624

(58) Field of Classification Search ......... 720/619–624
See application file for complete search history.

(56) References Cited

U.S. PATENT DOCUMENTS

| | | | | |
|---|---|---|---|---|
| 4,498,162 A | * | 2/1985 | Schatteman | 720/620 |
| 4,674,079 A | * | 6/1987 | Agostini | 720/623 |
| 4,682,320 A | * | 7/1987 | d'Alayer de Costemore d'Arc | 720/621 |
| 4,969,140 A | * | 11/1990 | Koiwa et al. | 720/621 |
| 5,173,894 A | * | 12/1992 | Kido | 720/623 |
| 5,255,255 A | * | 10/1993 | Kaneda et al. | 720/621 |
| 5,416,763 A | * | 5/1995 | Ohsaki | 720/623 |
| 5,737,293 A | * | 4/1998 | Kawamura et al. | 720/628 |
| 6,028,831 A | * | 2/2000 | Scholz et al. | 720/621 |
| 6,256,280 B1 | * | 7/2001 | Sakurai et al. | 720/620 |
| 6,449,234 B1 | * | 9/2002 | Ahn et al. | 720/619 |
| 6,463,025 B1 | * | 10/2002 | Scholz | 720/622 |
| 6,826,766 B1 | * | 11/2004 | Tuchiya | 720/620 |
| 2003/0099182 A1 | * | 5/2003 | Maeda et al. | 369/77.1 |
| 2004/0163092 A1 | * | 8/2004 | Makisaka et al. | 720/619 |
| 2005/0060727 A1 | * | 3/2005 | Hirano et al. | 720/622 |
| 2005/0235299 A1 | * | 10/2005 | Kido | 720/619 |

FOREIGN PATENT DOCUMENTS

JP  H06-048603  5/1991

* cited by examiner

*Primary Examiner*—Brian E. Miller
(74) *Attorney, Agent, or Firm*—Nath & Associates PLLC; Gregory B. Kang; Stanley N. Protigal

(57) ABSTRACT

A disc drive apparatus is comprised of an opening portion which can insert/eject a large disc shaped medium and a small disc shaped medium, a feeding roller which pulls in a disc shaped medium being inserted to the opening portion, oscillating links which have convex portions against which an end surface of the disc shaped medium which is guided inside the apparatus by the feeding roller, a locking plate which fixes the oscillating links, an actuating lever which is connected to one of the oscillating link, and a slide cam which starts moving toward the opening portion in conjunction with an oscillation of the actuating lever.

1 Claim, 5 Drawing Sheets

DISC DRIVE APPARATUS WITH LOADING MECHANISM FOR DIFFERENT SIZED DISCS

BACKGROUND OF THE INVENTION

1. Field of the Invention

The present invention relates to disc drive apparatuses which are used for erasing and filling with data on a disc shaped medium (a disc type recording medium) such as a compact disc (CD) and the like, and more particularly to a disc drive apparatus which can read and/or write two kinds of large and small disc shaped media having different diameters.

2. Description of the Related Art

In recent years, disc shaped media such as CD, DVD and the like have come into wide use as a recording medium for a voice and a screen image. Most of the CD and the DVD are unified in a diameter of 12 cm (a large-diameter disc), however, there are disc shaped media having a diameter of 8 cm which are called as a single CD (a small-diameter disc). The two kinds of large and small discs can be generally driven by one apparatus, however, apart from an apparatus structured such that the disc is set manually on a turn table, it is required to accurately position the two kinds of large and small disc shaped media in the disc drive apparatus using a transfer system by means of a feeding roller.

In the disc drive apparatus provided with the feeding roller, after discriminating a size of the disc shaped media which is guided to an inner portion of the apparatus by the feeding roller by means of a plurality of photo sensors, a solenoid is driven based on a discriminated signal from the photo sensors. In this type of disc drive apparatus, a position of a stopper pin is changed in correspondence to the size of the disc based on a series of operations.

However, in the disc drive apparatus having the structure mentioned above, since a lot of photo sensors are required for discriminating the size of the disc, there are problems that a high cost is required, and a complex control program is required. Further, there is a defect that a control system generates a malfunction if the photo sensors detect any foreign matter.

Accordingly, in another related art disk drive apparatus, the large and small disc shaped media are guided to a predetermined position by a link mechanism including a first switch actuating lever actuated by the small-diameter disc shaped media reaching a predetermined position, and a second switch actuating lever actuated by the large-diameter disc shaped media reaching a predetermined position, and a disc clamping motion and the like are executed by a switching operation by the first and second switch actuating levers (for example, Japanese Utility Model Application Publication No. H6-48603).

However, in the apparatus disclosed in the publication mentioned above, since a lot of parts are required for accurately position the large and small disc shaped media, in addition to the first and second switch actuating levers, there is a problem that the structure of the disc drive apparatus becomes complex. Further, since an end surface of the disc shaped media is brought into contact with the switch actuating lever, there is a requirement of a mechanism for moving the switch actuating lever apart from the disc end surface at a time of driving the disc shaped media.

The present invention is made by taking the circumstances mentioned above into consideration, and a main object of the present invention is to provide a disc drive apparatus which can position two kinds of large and small discs and read the discs well based on a simpler structure than the conventional one.

SUMMARY OF THE INVENTION

In order to achieve the object mentioned above, according to the present invention, there is provided a disc drive apparatus comprising: a casing having an opening portion capable of taking a small-diameter disc and a large-diameter disc having different diameters with each other in and out; a feeding roller guiding the disc inserted to the opening portion to an inner portion of the casing; a pair of oscillating links having convex portions against which an end surface of the disc pulled in by the feeding roller strikes, and oscillating in an opposite direction to each other; a locking means for fixing the oscillation of the pair of oscillating links; a freely oscillating actuating lever connected to one of the oscillating links; a slide cam starting movement toward the opening portion based on the oscillation of the actuating lever; a pressurizing portion formed in the slide cam, and pressing one end portion of the actuating lever based on the movement of the slide cam toward the opening portion at a time when the large-diameter disc is pulled in by the feeding roller; and a clamp mechanism clamping a center portion of the disc at a clamp position on a turn table in correspondence to the movement of the slide cam toward the opening portion, wherein in the case that the small-diameter disc is pulled in by the feeding roller, the small-diameter disc moves forward while oscillating the actuating lever, and stops at the clamp position by the convex portion of the pair of oscillating links in which the oscillation is fixed by the locking means, and in the case that the large-diameter disc is pulled in by the feeding roller, the fixation of the pair of oscillating links by the locking means is cancelled, and the large-diameter disc moves forward while compressing the convex portion of the pair of oscillating links, whereby the actuating lever is oscillated interlocking with the oscillation of the pair of oscillating links so as to start the movement of the slide cam toward the opening portion, and the pair of oscillating links are oscillated according to the pressing of the actuating lever by the pressurizing portion, and the convex portion is moved apart from the end surface of the large-diameter disc which is clamped at the clamp position.

DETAILED DESCRIPTION OF THE INVENTION

Figure 1:
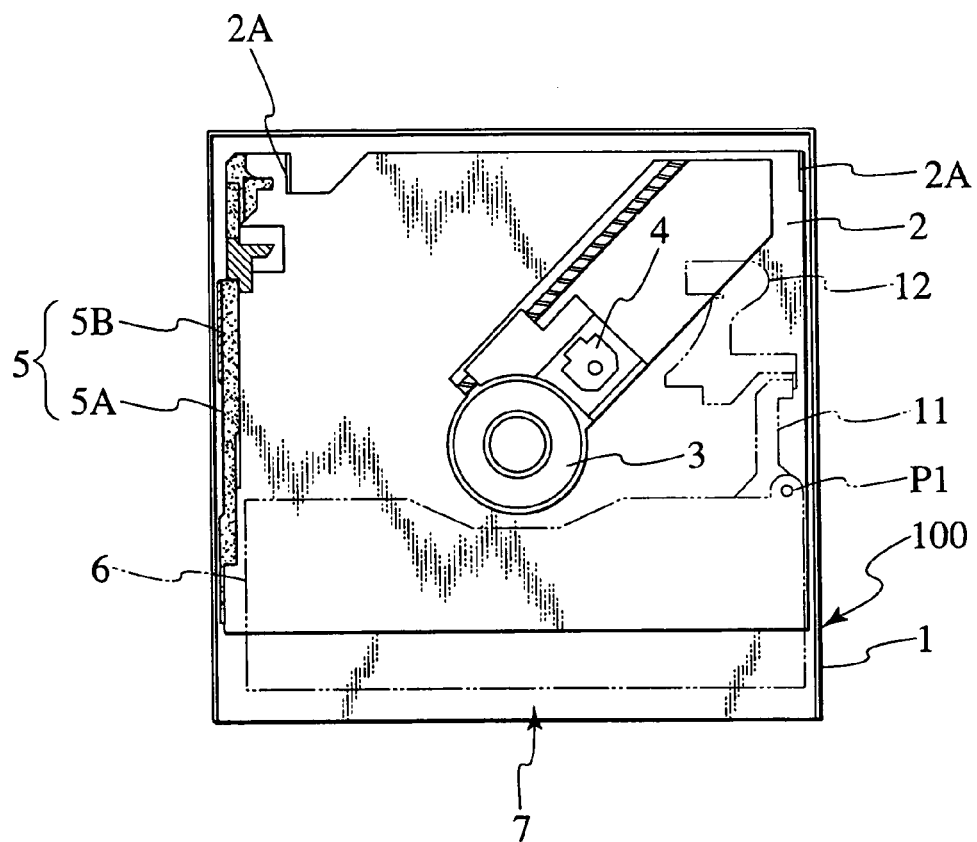
FIG. 1 is a plan schematic view of a disc drive apparatus according to the present invention.

A description will be in detail given below of an embodiment according to the present invention with reference to the accompanying drawings. In this case, in FIG. 1, an upper side in the drawing is defined as a rear side, and a side of an opening portion 7 mentioned below (a lower side in FIG. 1) is defined as a front side. Further, a direction from a top side of the paper sheet in FIG. 1 to a back side is defined as a vertical direction. Furthermore, hereinafter a disk shaped medium are referred to as a disk.

Figure 2:
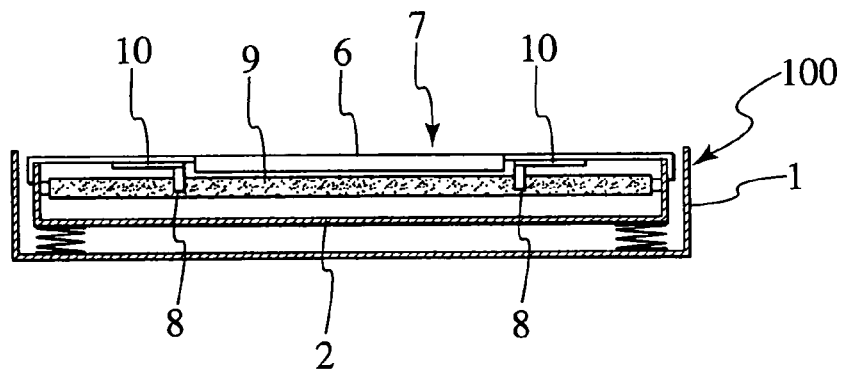
FIG. 2 is a front elevational schematic view of the disc drive apparatus according to the present invention.

With reference to FIGS. 1 and 2, a casing 100 is provided with a chassis 1, a base plate 2 supported within the chassis 1 via a shock absorber (not shown) and having a concave cross sectional shape, a turn table 3 provided inside the base plate 2 for rotating the disc, an optical pickup 4 moving in a radial direction of the disc, and the like. Further, the side surface of the base plate 2 is provided with a slide cam 5 capable of moving forward and backward along the side surface. The slide cam 5 is constituted by a can main body 5A and a rack 5B slidably mounted to the cam main body 5A, and the rack 5B is urged to a rear side by a spring (not shown).

A top plate 6 is fixed to a front one end portion of the base plate 2, and an opening portion 7 capable of taking a small-diameter disc (a CD having a diameter of 8 cm in the present embodiment) and a large-diameter disc (a CD having a diameter of 12 cm in the present embodiment) in and out is formed between the top plate 6 and the base plate 2. Accordingly, the casing 100 of the disc drive apparatus is provided with the opening portion 7. In FIG. 2, reference numeral 8 denotes a pair of right and left guide pins trailing to the opening portion from the top plate. In the case that the disc is inserted into the opening portion 7 from an external portion, the pair of guide pins 8 and 8 are expanded by an inserting force so as to allow the large-diameter disc and the small-diameter disc to pass therethrough, and the disc is inserted into the apparatus while being held by the top plate 6 and a feeding roller 9.

In this case, the feeding roller 9 is built in a state in which the feeding roller 9 can elevate between both side surfaces of the base plate 2 in a back side (a rear side in FIG. 1) of the opening portion 7, and a rotation driving force is transmitted to one end of the feeding roller 9 from a motor (not shown). Further, a cover plate (not shown) is mounted to the back surface of the top plate 6 via sheet metals 10 and 10 forming guide pins 8 and 8, and the disc is inserted and ejected while a non-recording layer of the disc is slidably in contact with the cover plate.

In this case, an unlocking plate 11 which can oscillate around a supporting point P1 as shown in FIG. 1 is mounted to the top plate 6, and the unlocking plate 11 oscillates in a clockwise direction in FIG. 1 via the sheet metal 10 at a time when the large-diameter disc passes through a portion between the guide pins 8 and 8. A locking plate 12 (a locking means) moves to a right side in FIG. 1 interlocking with the oscillation of the unlocking plate 11, whereby the oscillation fixation of an oscillating link mentioned below is cancelled.

Figure 3:
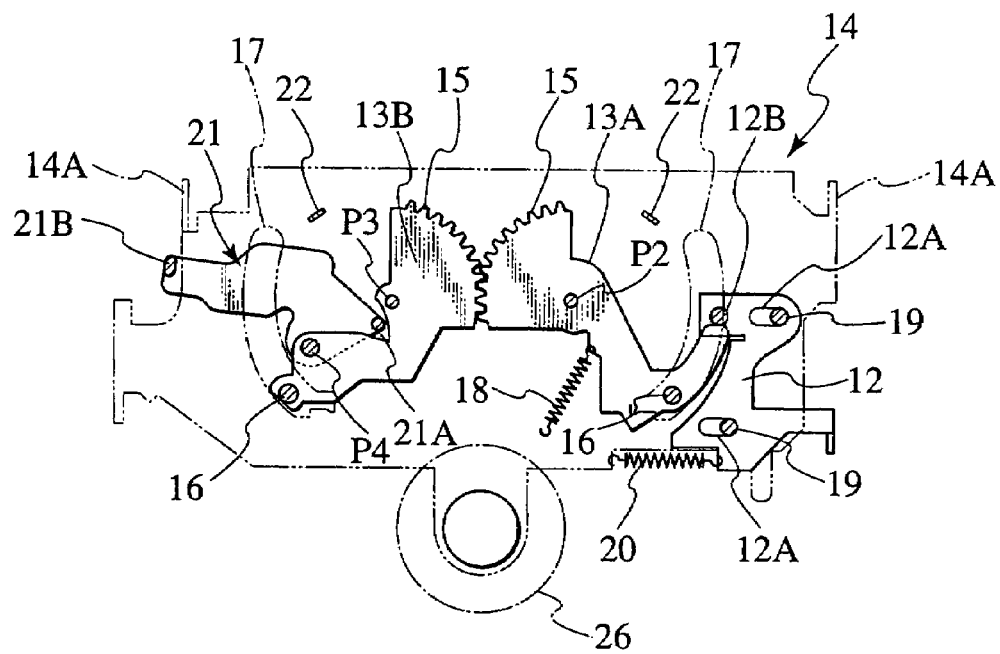
FIG. 3 is a plan view of a main portion of the disc drive apparatus according to the present invention.

With reference to FIG. 3, a pair of oscillating links 13A and 13B are mounted so as to freely oscillate around supporting points P2 and P3 with respect to a metal flap plate 14. One circular arc gear portion 15 provided in one end of one oscillating link 13A is engaged with another circular arc gear portion 15 provided in one end of another oscillating link 13B. the oscillating links 13A and 13B are oscillated in opposite directions to each other according to an engagement of a pair of gear portions 15 and 15. Further, a pin-shaped convex portion 16 is formed at a position which is apart from each of the supporting points P2 and P3, in each of the oscillating links 13A and 13B, and the convex portion 16 moves within a circular arc guide hole 17 provided in the flap plate 14. In this case, one oscillating link 13A is connected to the flap plate 14 by a spring 18 and is urged to a clockwise direction in FIG. 3. Accordingly, another oscillating link 13B is urged to a counterclockwise direction in FIG. 3 via the gear portion 15 based on an elastic force of the spring 18. Therefore, a pair of oscillating links 13A and 13B keep a state in which the convex portion 16 is brought into contact with one end of the guide hole 17 (an initial state).

Further, as shown in FIG. 3, the locking plate 12 is mounted to the flap plate 14. The locking plate 12 is supported by a fixed pin 19 provided in the flap plate 14 so as to freely move in a lateral direction in FIG. 3. In the locking plate 12, there are formed an elongate hole 12A for inserting the fixed pin 19 therethrough, and a lock pin 12B engaged with one end of the oscillating link 13A. Further, the locking plate 12 is urged to a left side in FIG. 3 by a spring 20 hanged with respect to the flap plate 14. In this case, the lock pin 12B is engaged with one end of the oscillating link 13A, whereby the oscillating links 13A and 13B with which the pair of gear portions 15 are engaged are fixed in an initial state. Since an interval between the convex portions 16 and 16 is smaller than a diameter of the small-diameter disc in this initial state, the small-diameter disc is not allowed to pass through.

On the other hand, an actuating lever 21 is provided in the oscillating link 13B arranged in a reverse side to the locking plate 12 so as to freely oscillate around a supporting point shaft P4 corresponding to a rotation axis with respect to the oscillating link 13B. Further, projections 21A and 21B protruding downwardly to both end portions which are apart from the supporting point shaft P4 are formed in the actuating lever 21. The projection 21A provided in a side of the oscillating link 13B is positioned between the convex portions 16 and 16 of the oscillating links 13A and 13B and in a slightly back side (rear side) from the convex portions 16 and 16, and the projection 21B in another end portion is positioned in an outer side from an end edge of the flap plate 14 in such a manner as to be partly in contact with the slide cam 5 shown in FIG. 1. The actuating lever 21 is controlled in an oscillating range based on a contact between the projection 21B and the end edge of the flap plate 14, and is structured such that the actuating lever 21 does not oscillate more in a clockwise direction in a state shown in FIG. 3. In the case that the small-diameter disc reaches the position of the convex portion 16, and thereafter the end surface of the small-diameter disc presses the projection 21A, and the actuating lever 21 is oscillated in a counterclockwise direction in FIG. 3.

Further, in the case that the large-diameter disc is inserted, the oscillation fixing of the oscillating links 13A and 13B is cancelled by the locking plate 12 before the large-diameter disc reaches the position of the pair of convex portions 16. Accordingly, the large-diameter disc is kept being inserted while compressing the convex portion 16 against an elastic force of the spring 18, and is stopped at a position at which the large-diameter disc is inserted until the end surface of the disc strikes against a pair of stoppers 22 formed in a rear portion of the flap plate 14. At this time, the end surface of the large-diameter disc is not brought into contact with the projection 21A. While the actuating lever 21 is moved to a rear side in conjunction with the oscillating links 13A and 13B oscillating by the insertion of the convex portion 16 by the large-diameter disc, the edge of the actuating lever 21 strikes against the rear portion of the flap plate 14, and the actuating lever 21 is oscillated in a counterclockwise direction in FIG. 3.

Figure 4:
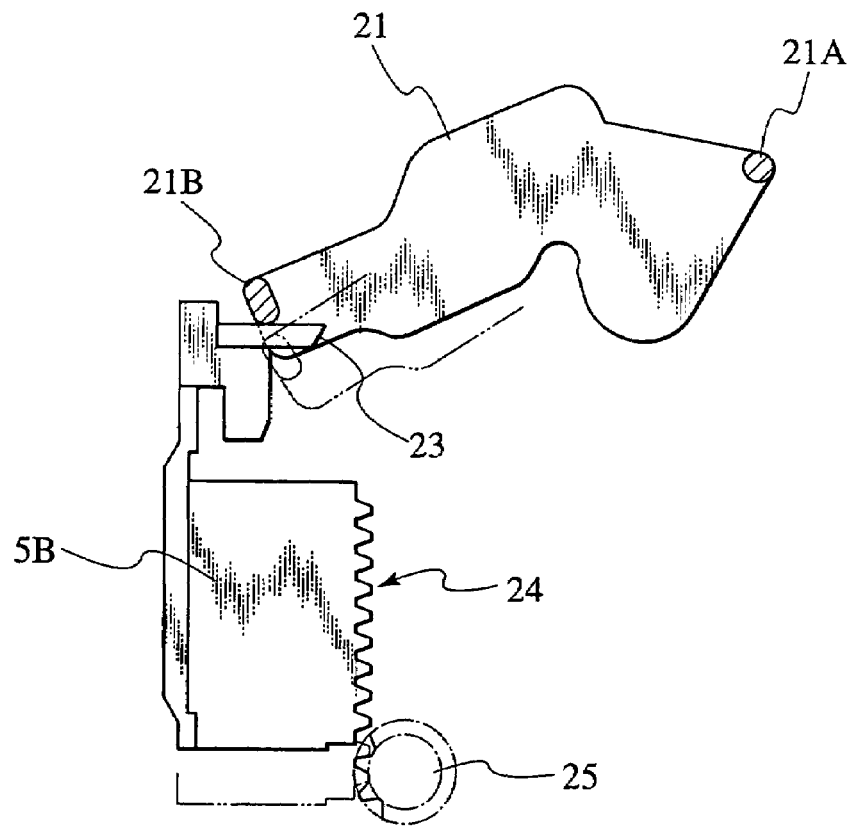
FIG. 4 is a partly enlarged view showing a state in which a slide cam is pressed by an actuating lever.

When the actuating lever 21 is oscillated in the manner mentioned above, the projection 21B formed in one end portion of the actuating lever 21 presses a rear portion of the slide cam 5 (in detail, a flange 23 formed in the rack 5B) as shown in FIG. 4. Accordingly, a tooth portion 24 of the rack 5B is engaged with a gear 25 provided in the base plate 2 so as to start a movement of the slide cam 5 (the cam main body 5A and the cam 5B) to a side of the opening portion 7, and thereafter a center of the disc is clamped on the turn table 3. A reading and/or writing of the disc is prepared according to the steps mentioned above.

In this case, in FIG. 3, reference numeral 26 denotes a disc shaped clamp plate for clamping the center portion of the disc in cooperation with the turn table 3. The clamp plate 26 is rotatably mounted to the flat plate 14 in opposition to the turn table 3. A rear portion 14A of the flap plate 14 is connected to a rear bracket 2A of the base plate 2 shown in FIG. 1 so as to freely oscillate vertically. At a time of clamping the disc, the flap plate 14 is oscillated to a lower side based on the elastic force of a torsion spring (not shown), and the clamp plate 26 is put on one surface of the disc center portion.

Figure 5:
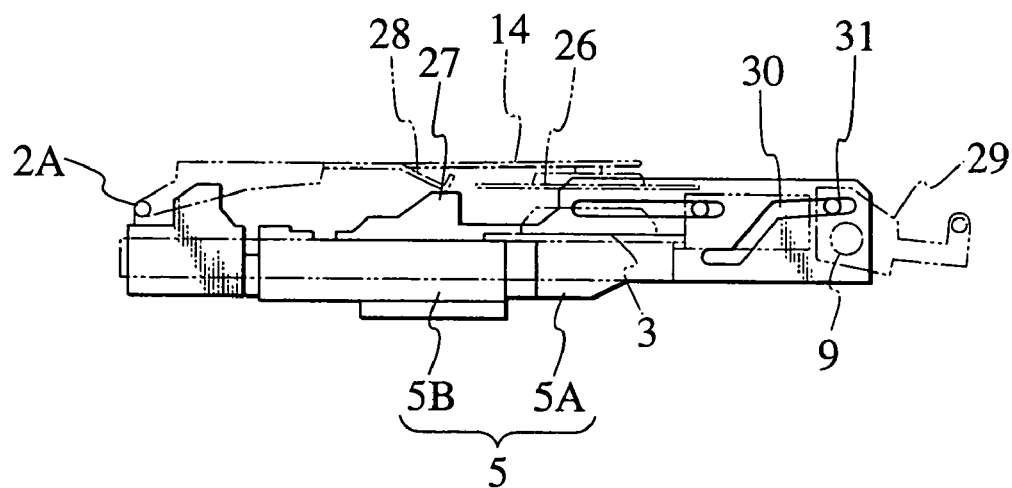
FIG. 5 is a side elevational view of a slide cam.

In other words, as shown in FIG. 5, a protruding portion 27 having an approximately trapezoidal shape is formed in the cam main body 5A of the slide cam 5, and an arm 28 corresponding to the protruding portion 27 is formed in the flat portion 14. The arm 28 is positioned on the protruding portion 27 until the disc is clamped, and a free end side of the flap plate 14 is lifted up against an elastic force of the torsion spring (not shown) in such a manner that the clamp plate 26 is apart from the turn table 3.

When the slide cam 5 moves to a side of the opening portion 7, the arm 28 comes off from the protruding portion 27, the flap plate 14 starts oscillating downwardly in conjunction with the elastic force of the torsion spring (not shown), the clamp plate 26 moves toward the turn table 3, and the disc is gripped between the clamp plate 26 and the turn table 3.

Further, in FIG. 5, reference numeral 29 denotes a swing arm which rotatably supports the feeding roller 9, and reference numeral 30 denotes a guide groove which is obliquely formed with respect to the cam main body. A pin 31 fixed to the swing arm 29 is inserted to the guide groove 30. Further, the guide groove 30 guides the pin 31 to a lower side in FIG. 5 at a time when the slide cam 5 moves to a side of the opening portion 7, whereby the feeding roller 9 moves apart from the reading layer of the disc at the same time of the clamping motion of the disc as mentioned above.

Figure 6:
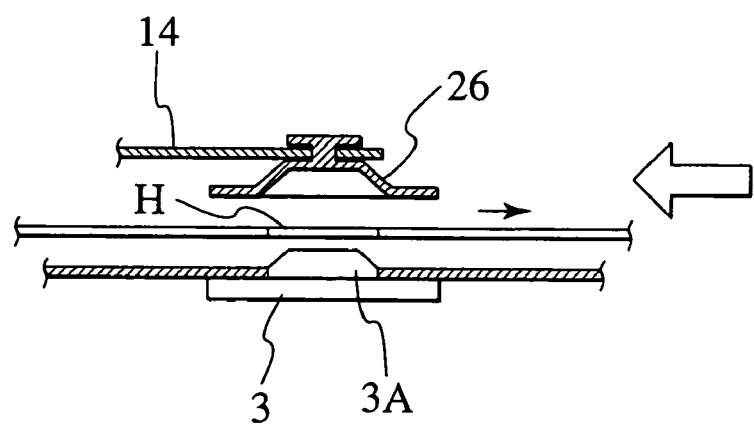
FIG. 6 is a partly cross sectional view showing a state in which a disc is clamped.
Figure 7:
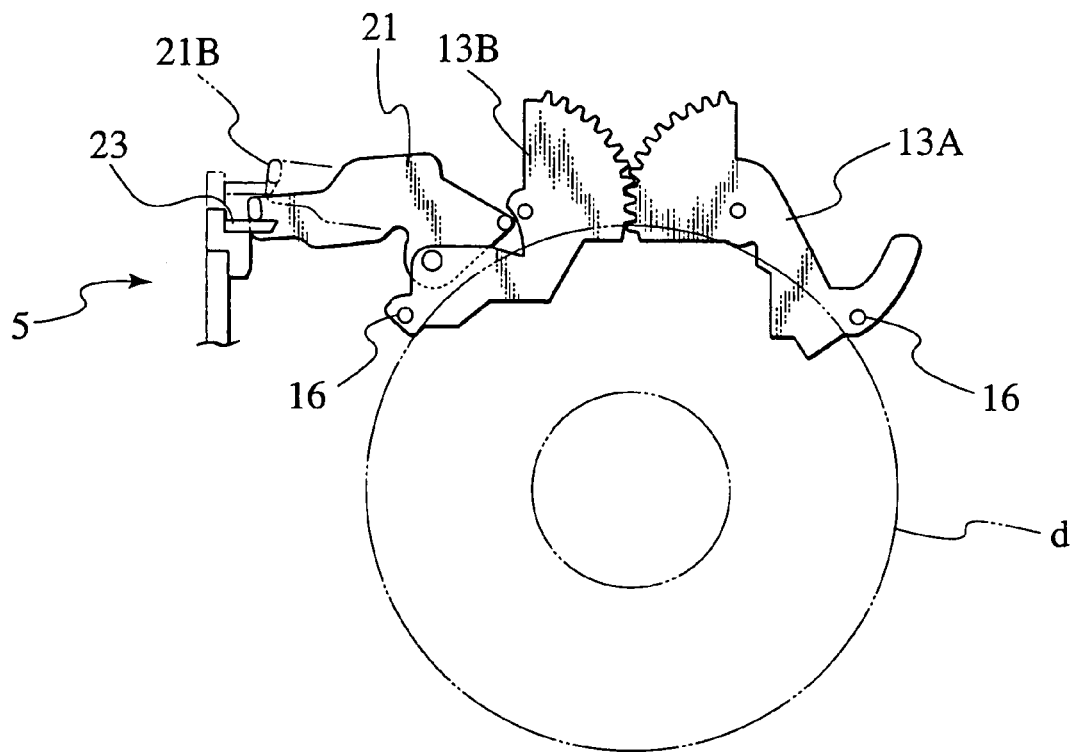
FIG. 7 is a plan schematic view showing a clamp state of a small-diameter disc.
Figure 8:
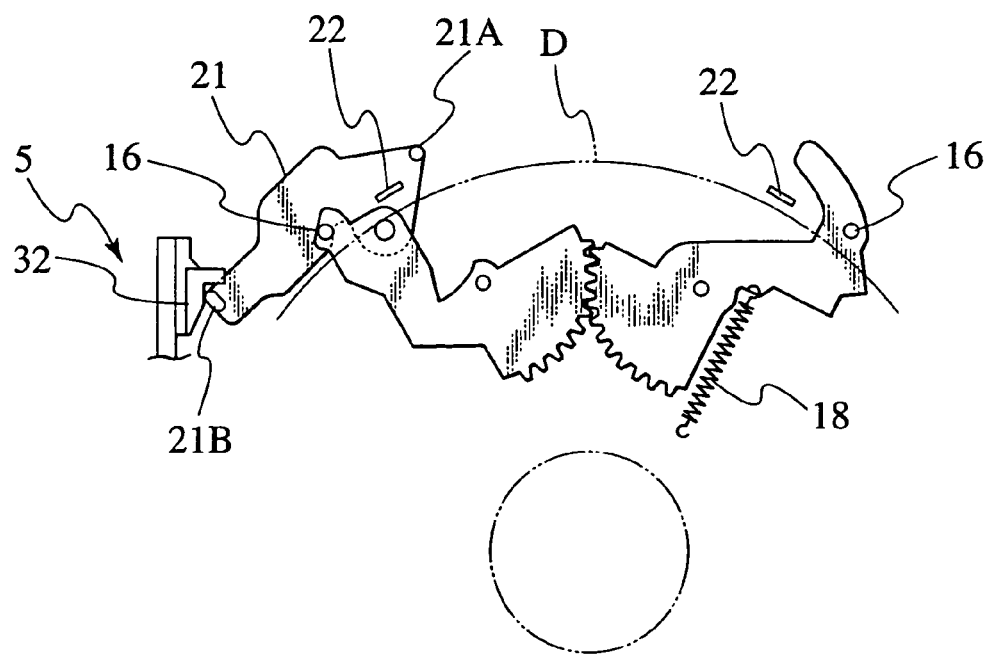
FIG. 8 is a plan schematic view showing a clamp state of a large-diameter disc.

When the disc is clamped as shown in FIG. 6, the disc slightly drops toward a side of the opening portion 7 (in a direction of a small arrow in FIG. 6) based on the fitting between a center hole H and a taper portion 3A of the turn table 3 (in this case, a large arrow in FIG. 6 shows a direction of inserting the disc). Accordingly, a small-diameter disc d is clamped in a state in which the convex portions 16 of the oscillating links 13A and 13B in the fixed state are not in contact with the disc end surface as shown in FIG. 7. Further, a large-diameter disc D is clamped in a state in which the disc end surface is not in contact with the stopper 22 as shown in FIG. 8, however, is clamped while keeping a state in which the convex portion 16 is brought into contact with the disc end surface based on the elastic force of the spring 18. In this case, in order to stably rotate the large-diameter disc D, there is required a mechanism for preventing the end surface of the large-diameter disc D and the convex portion 16 from being in contact with each other.

Figure 9:
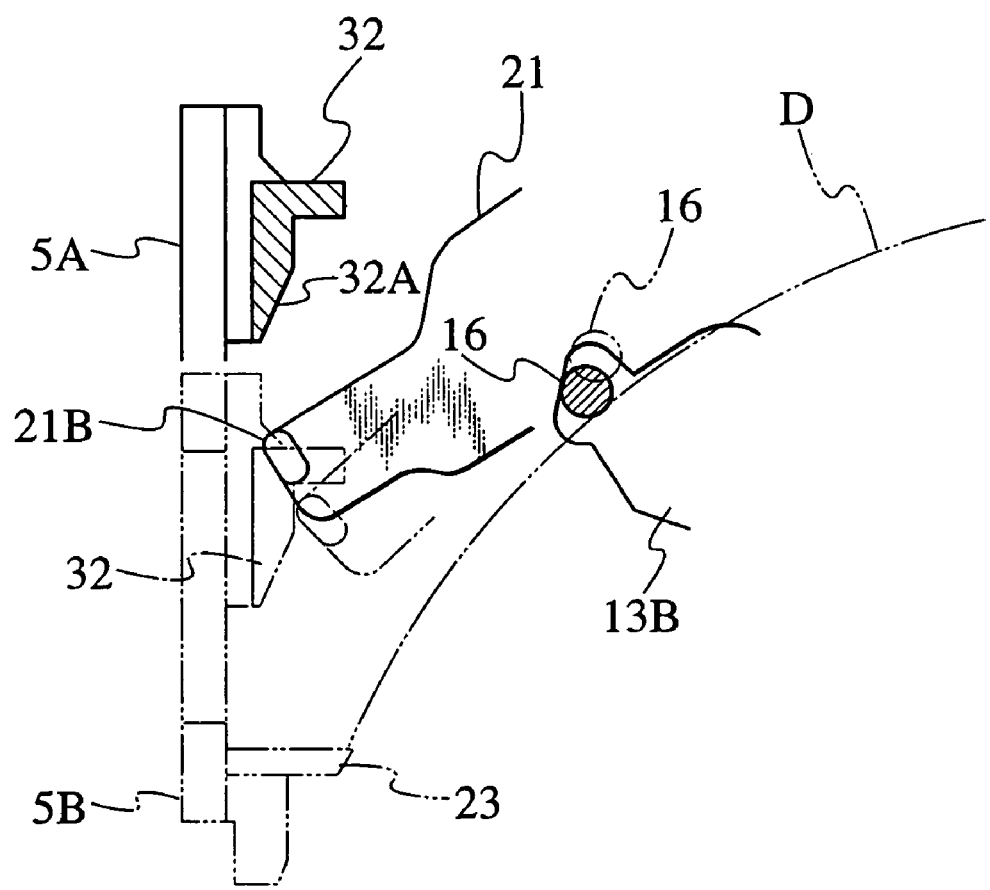
FIG. 9 is a partly enlarged view showing a state in which a convex portion is moved apart from an end surface of the large-diameter disc.

A description will be given of the mechanism with reference to FIG. 9. An angle rest pressurizing portion 32 in which a front end is formed as an oblique surface 32A is formed in one end portion (a rear portion of the cam main body 5A) of the slide cam 5, and the projection 21B of the actuating lever 21 is pinched between the pressurizing portion 32 and the flange 23 of the rack 5B. Further, since the slide cam 5 moves to the side of the opening portion 7 at a time of guiding the large-diameter disc D, the pressurizing portion 32 presses the projection 21B of the actuating lever 21 to an inner side of the casing 100. Accordingly, the pair of oscillating links 13A and 13B are oscillated in a direction against the elastic force of the spring 18, and the convex portion 16 moves apart from the end surface of the large-diameter disc D under the clamped state by the turn table 3 and the clamp plate 26 (refer to FIGS. 8 and 9). Therefore, it is possible to stably rotate the large-diameter disc D under an unloaded state while keeping the convex portion 16 apart from the end surface of the large-diameter disc D.

In this case, a description will be given of an operation of the disc drive apparatus structured in the manner mentioned above. When inserting the small-diameter disc d to the opening portion 7, a switch (not shown) is pushed and the feeding roller 9 is activated, whereby the small-diameter disc d is guided to the inner portion of the apparatus. The guided small-diameter disc d strikes against the convex portions 16 of the oscillating links 13A and 13B so as to be stopped at the clamp position, however, since the end surface of the small-diameter disc d presses the projection 21A of the actuating lever just before the stop, the actuating lever 21 is oscillated and the projection 21B provided in another end of the actuating lever 21 pushes the flange 23 of the rack 5B. Accordingly, the tooth portion 24 of the rack is engaged with the rotating gear 25 and the slide cam 5 is moved to the side of the opening portion 7 (to a front side), whereby the clamp plate 26 moves downward and the end surface of the small-diameter disc d moves apart from the convex portion 16 of the oscillating link while the small-diameter disc d is clamped between the clamp plate 26 and the turn table 3. At the same time of this, the feeding roller 9 moves apart from the writing surface of the small-diameter disc d so as to prepare to write and/or read the small-diameter disc d.

On the other hand, in the case of inserting the large-diameter disc D to the opening portion 7, the switch (not shown) is pushed and the feeding roller 9 is rotated, whereby the large-diameter disc D is pulled in. At this time, the oscillation fixing of the oscillating links 13A and 13B by the locking plate 12 is cancelled based on the oscillation of the unlocking plate 11. Accordingly, the large-diameter disc D does not stop even in the case that the end surface thereof strikes against the convex portion 16 of the oscillating link, and the large-diameter disc D keeps moving forward until the end surface strikes against the stopper 22 while compressing the convex portion 16. At this time, the oscillating links 13A and 13B are oscillated against the elastic force of the spring 18, and the actuating lever 21 is oscillated based on the striking of the edge of the actuating lever 21 against the rear portion of the flap plate 14, while the actuating lever 21 is moved rearwardly. As a result, in the same manner as the case of the small-diameter disc, the projection 21B of the actuating lever 21 pushes the flange 23 of the rack so as to start moving the slide cam 5 to the side of the opening portion (to the front side). Accordingly, the clamp plate 26 moves downwardly, and the end surface of the large-diameter disc D moves apart from the stopper 22 while clamping the large-diameter disc D between the clamp plate 26 and the turn table 3. At the same time, the feeding roller 9 is moved apart from the writing surface of the large-diameter disc D. Further, at this time, the pressurizing portion 32 of the slide cam 5 presses the projection 21B of the actuating lever to the inner side of the casing 100, whereby the oscillating links 13A and 13B are oscillated in a direction against the elastic force of the spring 18 via the actuating lever 21. Therefore, the convex portion 16 moves apart from the end surface of the large-diameter disc D so as to prepare to read and/or write the large-diameter disc.

The disc drive apparatus according to the embodiment mentioned above of the present invention can be applied to the other disc reading and/or writing apparatuses in addition to the CD player.

As is apparent from the description mentioned above, according to the disc drive apparatus based on the present invention, it is possible to accurately position the disc based on the smaller number of the parts than the conventional one, a failure factor can be reduced by reducing the number of the parts, and it is possible to achieve a downsizing of the apparatus and a cost reduction. Further, since it is possible to stably rotate the disc in the unloaded state even in the case that the disc is the large-diameter disc, it is possible to read and/or write well.

What is claimed is:

1. A disc drive apparatus comprising:

a casing having an opening portion which is capable inserting/ejecting a small-diameter disc and a large-diameter disc having different diameters one another;

a feeding roller guiding the disc inserted to the opening portion to an inner portion of the casing;

a pair of oscillating links oscillating in an opposite direction to each other and having convex portions to which an end surface of the disc guided inside the casing by the feeding roller comes into contact with;

a locking means for fixing the oscillation of the pair of oscillating links;

an actuating lever which is connected to one of the oscillating links so as to freely oscillate;

a slide cam which moves toward the opening portion in conjunction with oscillation of the actuating lever;

a pressurizing portion formed in the slide cam, and pressing one end portion of the actuating lever in conjunction with the movement of the slide cam toward the opening portion at a time when the large-diameter disc is guided inside the inner portion of the casing by the feeding roller; and a clamp mechanism clamping a center portion of the disc at a clamp position on a turn table in conjunction with the movement of the slide cam toward the opening portion, wherein in the case that the small-diameter disc is guided inside the inner portion of the casing by the feeding roller, the small-diameter disc moves forward while oscillating the actuating lever, and stops at the clamp position by the convex portion of the pair of oscillating links in which the oscillation is fixed by the locking means, and wherein in the case that the large-diameter disc is guided inside the inner portion of the casing by the feeding roller, the fixation of the pair of oscillating links by the locking means is cancelled, and the large-diameter disc moves forward while moving the convex portion toward inside the casing, whereby the actuating lever is oscillated in conjunction with the oscillation of the pair of oscillating links so as to start the movement of the slide cam toward the opening portion, and the pair of oscillating links are oscillated according to the pressing of the actuating lever by the pressurizing portion, and the convex portion is moved apart from the end surface of the large-diameter disc which is clamped at the clamp position.

* * * * *